UNITED STATES PATENT OFFICE.

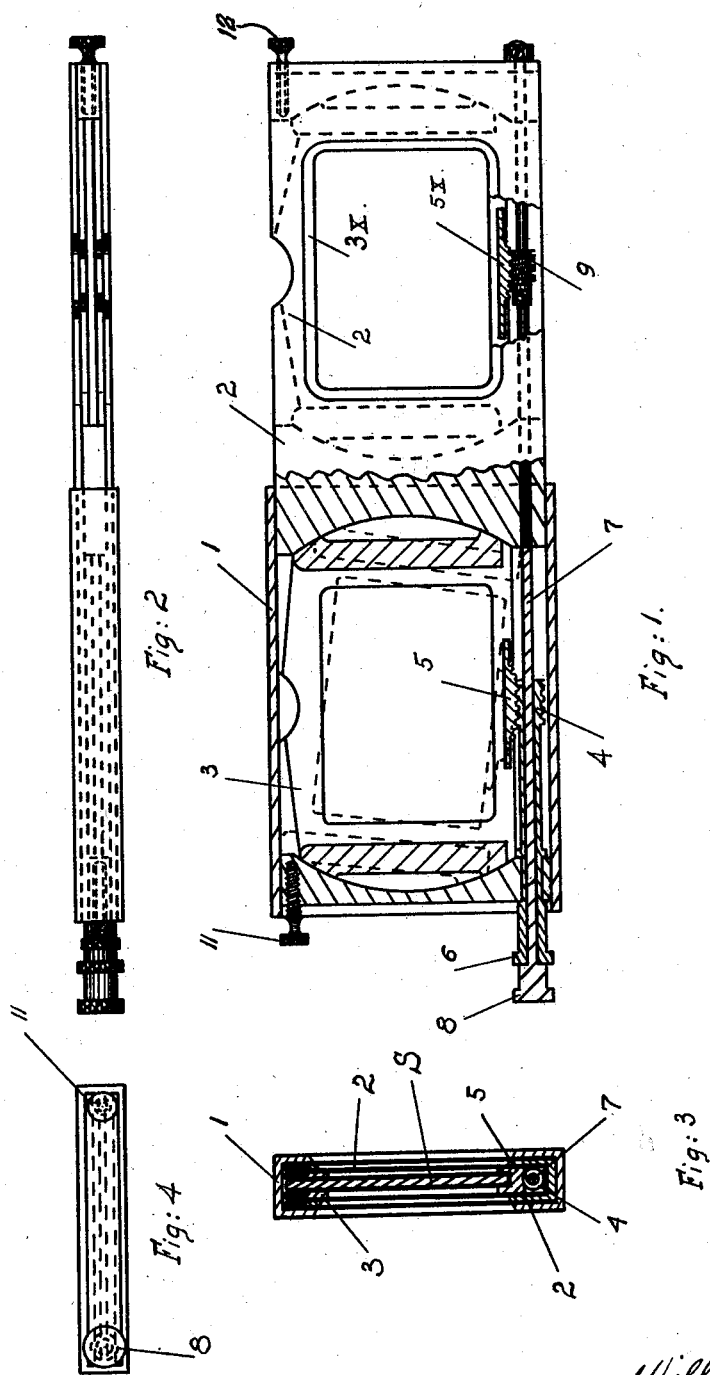

WILLIAM WENDERHOLD, OF NEW YORK, N. Y., ASSIGNOR, BY MESNE ASSIGNMENTS, TO CRU PATENTS CORPORATION, A CORPORATION OF NEW YORK.

PROJECTION SLIDE CARRIER.

1,407,906.  Specification of Letters Patent.  Patented Feb. 28, 1922.

Application filed March 2, 1918. Serial No. 220,091.

*To all whom it may concern:*

Be it known that I, WILLIAM WENDERHOLD, a citizen of the United States, residing at New York, in the county and State of New York, have invented certain new and useful Improvements in Projection Slide Carriers, of which the following is a clear, full, and exact description.

My invention relates to an improvement in a holder for projecting slides and a carrier therefor.

The object of my invention is to provide a slide holder that is adjustable so that the picture can be brought into proper alignment horizontally and axially as the pictures on the slides are not always straight therein.

Referring to the drawings,

Fig. 1 is a side elevation, partly in cross-section of my invention.

Fig. 2 is a top view of the device.

Fig. 3 is an end view.

Fig. 4 is a vertical cross-section of my device.

As shown in Fig. 1, the slidable member 2 is mounted in the main support 1. This main support 1 is usually firmly held in the projection lantern. In the slidable member 2 is mounted the slide holder 3, which holder can be slightly revolved in the member 2 by means of the worm, which engages the worm sector 5, forming a part of the holder 3. The worm 4 is hollow and is operated by the knob 6. Through the worm 4 is loosely mounted the shaft 7 which shaft is operated by the knob 8. Worm 9 is fastened to shaft 7 operating the second carrier 3ˣ in the same manner as carrier 3 by means of a worm sector. The carriers 3 and 3ˣ have a slotted opening in the center to receive the slide S.

By pulling the slidable member 2 back and forth in the frame 1, the slides are brought alternately into the light beams of a projection lantern. This operation is the same in the slide carriers heretofore known.

To adjust the exact position horizontally of the member 2 relative to member 1, I provide adjustment or limit screws 11 and 12, by means of which screws the amount of sliding allowed to member 2 is adjustably limited, since the shoulder (not shown) is larger than the slide opening in member 1.

From the foregoing description it is easily seen that the position of a slide in this carrier is controlled and operatable while a slide is being exhibited.

While I have shown and described a specific structure embodying the principles of my invention, I wish it to be understood that my invention in its broad scope as defined by the claims is not to be limited or restricted thereto, as many changes in details of construction will readily appear to those skilled in the art without departing from the contemplated spirit and scope of my invention.

What I claim as my invention is:

1. In a projection slide holder, a supporting frame and a pair of slidable members cooperating therewith, slide carriers for each of said members, said carriers being provided with sectors, independent adjusting means for engaging said sectors to adjust the position of a slide in its carrier while the slide is being projected.

2. In a projection slide holder, a supporting frame and a pair of slidable members cooperating therewith, extensible adjusting means carried by said frame, a slide carrier for each of said slidable members, sectors on said carriers for engaging independent worms whereby the position of each slide may be positioned at different angles while the slide is being exhibited.

Signed at the city, county and State of New York, this 1st day of March, one thousand nine hundred and eighteen.

WILLIAM WENDERHOLD. [L. S.]